United States Patent Office 3,244,666
Patented Apr. 5, 1966

3,244,666
SYNTHETIC RUBBER STABILIZED WITH THE REACTION PRODUCT OF AN ALKYL HYDROXYAROMATIC COMPOUND AND A POLYALKYLENE AMINE
Paul D. Sharpe, Baldwin, N.Y., assignor to Socony Mobil Oil Company, Inc., a corporation of New York
No Drawing. Filed July 17, 1963, Ser. No. 295,822
9 Claims. (Cl. 260—45.9)

This invention, a continuation-in-part of my prior application Serial No. 852,230, filed Nov. 12, 1959, now abandoned, relates to rubber compounding and is particularly directed to the development of synthetic rubber compounds having resistance to oxidative degradation and having improved resistance to discoloration from heat and light.

It is well known to incorporate in synthetic rubber compounds, various amounts of antioxidants, depending upon the type of polymer employed and the end-use of the compound. These antioxidants are also incorporated with the polymerizing material during polymerization, to prevent resinification of the polymer in storage. Some typical antioxidants are styrenated phenol, styrene-phenol reaction product, alkylated aryl phenol, 2,2'-methylene bis(4-ethyl-6-tertiary butyl phenol), para-phenyl phenol, and monobenzyl ether of hydroquinone. N-phenyl beta-naphthylamine and the high temperature reaction product of diphenylamine and acetone are marketed as antioxidants but are of the straining type. Other rubber antioxidants are found at page 882, vol. II of "Encyclopedia of Chemical Technology," edited by Kirk and Othmer and published by the Interscience Encyclopedia, Inc., New York.

This invention resides in the discovery that certain new compounds protect synthetic rubber against the influence of light, heat and oxygen. These compounds are also useful in accelerating the cure of synthetic rubber. These new phenol-amine reaction products are commingled with the synthetic rubber in small amounts but sufficient to provide the desired protected product.

It is an object of this invention to provide an improved synthetic rubber product.

Another object of this invention is to provide a synthetic rubber product having increased resistance to oxidation.

A further object of this invention is to provide a synthetic rubber product having reduced tendency to stain.

A still further object of this invention is to provide a synthetic rubber product having an accelerated rate of cure.

Other objects and advantages inherent in the invention will become apparent to those skilled in the art, from the following detailed description.

In general, the present invention provides synthetic rubbers containing between about 0.1 and about 10 parts per hundred and, preferably, between about 1 and about 4 parts per hundred, by weight, of the reaction product of an alkyl hydroxyaromatic compound having from 8 carbon atoms to about 34 carbon atoms in the alkyl portion thereof, and being otherwise unsubstituted, and a polyalkylene-amine having the formula $$H_2NRNH(RNH)_xH$$

wherein R is an alkylene radical having 2 or 3 carbon atoms, and $x$ is an integer varying between 1 and 3, the molar ratio of the alkyl hydroxyaromatic compound to the polyalkylene-amine varying between about 1 and about 6.

As indicated above, the hydroxyaromatic compound reactant used in the reaction products of this invention are alkylated hydroxyaromatic compounds containing from 8 carbon atoms to about 34 carbon atoms in the alkyl portion, and being otherwise unsubstituted. Alkylation of the aryl hydroxide may be accomplished by methods known to the art, such as by a Friedel-Crafts synthesis using a halogenated hydrocarbon. The alkylation may also be effected by reaction of the aryl hydroxide with unsaturated hydrocarbons or alcohols, in the presence of a suitable catalyst, such as $H_2SO_4$, $ZnCl_3$, $BF_3$, HF, etc.

Typical aryl hydroxides which may be used as the starting material for the alkylation reaction are: phenol, resorcinol, hydroquinone, catechol, cresol, xylenol, hydroxdiphenyl, benzylphenol, phenyl-ethyl-phenol, phenol resins, methyl-hydroxydiphenyl, quaiacol, alpha and beta naphthol, alpha and beta methyl naphthol, tolyl naphthol, xylyl naphthol, benzyl naphthol, anthranol, phenyl methyl naphthol, phenanthrol, chlorphenol, and the like. Preference, in general, is to the monohydroxy phenols otherwise unsubstituted, particular preference being given to phenol and alpha and beta naphthol.

The hydroxyaromatic compound may have one or several alkyl groups attached to the nucleus thereof. In any case, the alkyl portion of this compound should contain a total of at least 8 carbon atoms. Thus, if the alkyl substituent contains less than 8 carbon atoms, the aromatic nucleus should contain more than one such substituent to bring the carbon atoms content of the side chains so attached to 8, in order to provide reaction products of this invention. On the other hand, the hydrocarbon from which the alkyl group is derived may suitably contain up to about 34 carbon atoms. In fact, a preferred source of the alkyl substituent is petroleum wax which contains hydrocarbon molecules having from about 21 to about 34 carbon atoms per molecule. Other suitable alkyl hydroxyaromatic compounds, are, for example, octylphenol, diamylphenol, decylphenol, laurylphenol, tetradecylphenol, hexadecylphenol and octadecylphenol.

The various alkylphenols utilized in the invention, are either available commercially or the method for their preparation are within the skill of those versed in the art. The preparation of a wax-alkylated type of product, designated as Chlorowax, is illustrated by the following procedure.

A paraffin wax melting at approximately 120° F. and predominantly comprised of hydrocarbons having at least 20 and an average of about 24 carbon atoms in their molecules, is melted and heated to about 200° F., after which chlorine is bubbled therethrough until the wax has absorbed about 14 percent by weight, of chlorine. A sufficient quantity of this chlorinated wax (Chlorowax) to provide three atomic proportions of chlorine is then heated to a temperature varying from just about its melting point to not over 150° F. One mole of phenol ($C_6H_5OH$) is then mixed with the Chlorowax. The mixture is then heated to about 150° F. and a quantity of anhydrous aluminum chloride, corresponding to about 3 percent of the weight of the Chlorowax in the mixture, is slowly added with active stirring. The rate of addition of the aluminum chloride should be sufficiently slow to avoid violent foaming and during the addition the temperature should be held at about 150° F. After the aluminum chloride has been added, the temperature of the mixture may be increased slowly over a period of from 15 to 25 minutes to a temperature of about 250° F. and then should be more slowly increased to about 350° F. To control the evolution of HCl gas, the temperature of the mixture is, preferably, raised from 250° F. to 350° F. at a rate approximately one degree per minute, the whole heating operation occupying approximately two hours from the time of adding the aluminum chloride. If the emission of HCl gas has not ceased when the final temperature is reached, the mixture may be held at 350° F. for a short time to allow completion of the reaction. However, to avoid possible cracking of the wax, the mixture should not be heated appreciably above 350° F., nor should it be held at that temperature for any extended length of time.

It is important that all unreacted, or non-alkylated phenol remaining in the reaction mixture, as well as aluminum chloride, be removed. This can be conveniently effected by washing the product several times with a mixture of water and an alcohol, such as butanol, preferably at elevated temperature; e.g. 175° F. The product may then be treated with steam. This latter step will insure complete removal of the unreacted material and also dry the product.

It will be understood that a wax-substituted phenol prepared according to the above procedure in which a quantity of Chlorowax sufficient to provide three atomic proportions of chlorine and having a chlorine content of 14 percent is reacted with one mole of phenol is designated as "wax-phenol (3–14)." Similarly, "wax-phenol (3–10)" and "wax-phenol (1–10)" may also be prepared by the reaction of sufficient amounts of this chlorinated wax, containing 10 percent, by weight, of chlorine, to provide three atomic proportions and one atomic proportion of chlorine per mole of phenol, respectively, in the reaction and are useful in the invention. In general, the amount of Chlorowax, containing from about 10 percent to 18 percent, by weight, of chlorine, used in the reaction is sufficient to supply between one and four atomic proportions of chlorine per mole of phenol used.

The polyalkylene-amine reactants utilizable herein are those compounds having the structural formula:

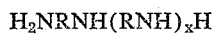

$$H_2NRNH(RNH)_xH$$

wherein R is an alkylene group of 2 or 3 carbon atoms, i.e., ethylene or propylene, and $x$ is an integer varying between 1 and 3. Thus, the amines contemplated are diethylenetriamine, triethylenetetramine, dipropylenetriamine, tripropylenetetramine, tetraethylenepentamine, and tetrapropylenepentamine. These compounds are generally commercially available. They are made by several methods well known to the art. One method involves the reaction of ammonia with an alkyl dihalide. For example, tetraethylenepentamine has been made by reacting ammonia with ethylene dibromide.

The molar ratio of alkylated hydroxyaromatic compound reactant to polyalkylene-amine reactant can vary between about one and about 6. A ratio of about 2, however, generally produces a product that gives optimum performance. It is to be understood that the ratio will not necessarily be a whole number. Thus, for example, a molar ratio of 1.5, i.e., 1.5:1, is within the contemplation of this invention.

As indicated above, the synthetic rubbers of the present invention contain the aforementioned reaction product of the alkyl hydroxyaromatic compound and the polyalkylene-amine, as an antioxidant. In order to realize the above-described benefits of the thus-incorporated antioxidant, it is essential that the alkyl hydroxy-aromatic compound and the polyalkylene-amine be separately reacted to form the reaction product external to the synthetic rubber, and thereafter be incorporated therein. These benefits are not realized, however, by the separate introduction of the aforementioned reactants into the rubber, since the desired improvements do not result from the mere additive effect of the alkyl hydroxyaromatic compound and the polyalkylene-amine. A true reaction product must first be formed.

The reaction between the alkyl hydroxyaromatic compound and the polyalkylene-amine is exothermic. It is carried out at temperatures varying between ambient temperatures (about 20° C.) and about 200° C. From a practical and economical standpoint, temperatures of about 100° C. are most desirable. The time of reaction can vary between about one-half hour and about 6 hours. Ordinarily solvents are not required. In some cases, as with wax-substituted phenols, a solvent may be desirable to ensure fluidity. Suitable solvents are nonpolar hydrocarbons, such as benzene, toluene, xylene, and the like.

The reaction products described hereinabove are blended with various types of synthetic rubber in the ratio of about 1–4 parts per hundred. The synthetic rubber may be "hot" or "cold." For example, the rubber may be SBR (styrene-butadiene rubber); a polymer of chloroprene, such as neoprene; or butyl rubber (isobutylene-isoprene butyl rubber); and in the prescribed ratio, the product will show substantially improved resistance to breakdown from heat and the damaging effects of oxygen. The effectiveness of the compound can be demonstrated in comparative tests with alternative antioxidants in the same rubber base and also with control compounds containing no antioxidants. The product containing the reaction products of this invention showed greater retention of physical properties after accelerated oven tests. These products also demonstrated better non-staining characteristics in comparative tests made under exposure to sun lamps where the degree of staining in each case was visually estimated. The base rubber must be a synthetic rubber to provide the improved compounds of this invention. The reaction products described hereinabove are not effective with natural rubber. While no reason for this result is postulated, it is possible that this may be related to the acceleration effect of the material in the cure rate of the synthetic rubber compounds.

It is contemplated that other addition agents can be included in the rubber formulation to improve other characteristics. Thus, for example, there can be present:

(1) Carbon black to reinforce the rubber.

(2) Accelerator activators such as metallic oxides (e.g. zinc oxide and magnesium oxide) or organic acids (e.g. stearic acid) which enable accelerators to exercise their maximum effect. Combinations of both a metallic oxide, such as zinc oxide, and an organic acid, such as stearic acid, are generally used in a rubber compound of the SBR type.

(3) Sulfur to vulcanize or cure the rubber compound and give it rubbery properties.

(4) Accelerators to reduce the time and the temperature required to effect vulcanization. Accelerators not only increase the rate of cure but also improve the physical properties and aging of rubber compounds.

(5) Softeners or materials which, when added to a rubber compound, will render the plastic unvulcanized compound more plastic and will also make the elastic vulcanized compound softer. Softeners also improve processing and aid in the dispersion of compounding ingredients.

*Examples 1–9*

A series of reaction products of this invention were made using the same general procedure. In each case, the hydroxyaromatic compound reactant and the polyalkylene-amine reactant were mixed and stirred for about one hour at 100° C. Reactants and molar ratios were varied. The reactants and ratio used in each example are set forth in Table I.

TABLE I

| Example | Hydroxyaromatic | Grams | Moles | Polyalkylene-amine | Grams | Moles | Molar Ratio |
|---------|-----------------|-------|-------|--------------------|-------|-------|-------------|
| 1 | Dinonyl phenol | 346 | 1 | DETA | 51.5 | 0.5 | 2 |
| 2 | Dinonyl phenol | 346 | 1 | TETA | 73 | 0.5 | 2 |
| 3 | Monododecyl phenol | 262 | 1 | TEPA | 95 | 0.5 | 2 |
| 4 | Dinonyl phenol | 346 | 1 | DPTA | 66 | 0.5 | 2 |
| 5 | Dinonyl catechol | 250 | 0.7 | TETA | 90 | 0.50 | 1.4 |
| 6 | Dinonyl resorchinol | 250 | 0.7 | TETA | 90 | 0.50 | 1.4 |
| 7 | Wax phenol (3-14) | 400 | 0.5 | TETA | 13 | 0.09 | 5.56 |
| 8 | Dinonyl phenol | | | EDA | | 0.5 | |
| 9 | Monononyl phenol | 660 | 1 | TETA | 219 | 0.5 | 2 |

DETA=diethylene triamine.
TETA=driethylene tetramine.
TEPA=tetraethylene pentamine.
DPTA=dipropylene triamine (3,3'-imino-bis-propylamine).
EDA=ethylene diamine.

When rubber ages, it is generally agreed that ordinary deterioration is caused by oxidation of the rubber hydrocarbon. Antioxidants or age-resisters are used to retard this deterioration or aging as much as possible.

Since natural or shelf aging requires many years, laboratory accelerated aging tests are used to assess the value of antioxidants. The general scheme of conducting an accelerated aging test of a rubber compound is to expose properly prepared specimens (usually unstretched) to the action of controlled deteriorating influences for designated periods, and then to evaluate the age resistance by comparing their original and aged tensile properties.

One practical test involving heat and oxygen is the air oven test. Properly compounded rubber samples are vulcanized. Dumbbells are died from the cured stock and tensile properties obtained. Duplicate samples are subjected to accelerated temperature in a forced draft air oven. By using an elevated temperature, the test and effects are hastened. For example, to obtain a 50% loss in tensile strength, the results at 100° C. are approximately 17 times as fast as at 70° C.

The beneficial effects on heat aging of cold polymerized SBR (styrene-butadiene rubber) with the antioxidants evaluated are shown in the following examples in which comparison is made with a control compound containing no antioxidant.

A base formulation was prepared in the following proportions:

| | Parts by weight |
|---|---|
| SBR 1500 | 100.00 |
| Easy process channel black | 40.00 |
| Zinc oxide | 5.00 |
| Sulfur | 2.00 |
| Benzothiazyl disulfide | 1.75 |
| | 148.75 |

Example I

An aging test was conducted using the base formulation and addition of 1, 2, 3 and 4 parts by weight of test product 5 of Table I. The unaged properties were found to be:

| | Blank | 1% | 2% | 3% | 4% |
|---|---|---|---|---|---|
| Tensile Strength, p.s.i. | 2,155 | 2,495 | 2,920 | 2,610 | 2,320 |
| Ultimate Elongation, percent | 625 | 420 | 415 | 420 | 370 |
| Shore A Hardness | 55 | 64 | 65 | 65 | 69 |

The properties after air oven aging 72 hours at 212° F. were found to be:

| | Blank | 1% | 2% | 3% | 4% |
|---|---|---|---|---|---|
| Tensile Strength, p.s.i. | 1,315 | 1,920 | 2,220 | 2,170 | 2,225 |
| Ultimate Elongation, percent | 265 | 220 | 235 | 240 | 245 |
| Shore A Hardness | 70 | 72 | 74 | 74 | 75 |

The retention of properties after air oven aging for 72 hours at 212° F. was found to be:

| | Blank | 1% | 2% | 3% | 4% |
|---|---|---|---|---|---|
| Tensile Strength, percent retained | 61 | 77 | 76 | 83 | 95 |
| Ultimate Elongation, percent retained | 42 | 52 | 56 | 57 | 66 |
| Hardness Change, points | 15 | 8 | 9 | 9 | 6 |

The effectiveness of the rubber antioxidants is seen in the excellent retention of original properties, the additive producing an increased retention of tensile strength, retention of elongation and decrease in hardening effect.

Example II

An aging test was conducted using the base formulation and additions of 1, 2, 3 and 4 parts by weight of test product 9 of Table I. The unaged properties were found to be:

| | Blank | 1% | 2% | 3% | 4% |
|---|---|---|---|---|---|
| Tensile Strength, p.s.i. | 2,155 | 2,980 | 3,055 | 2,360 | 2,390 |
| Ultimate Elongation, percent | 625 | 430 | 390 | 320 | 330 |
| Shore A Hardness | 55 | 65 | 67 | 69 | 69 |

The properties after air oven aging 72 hours at 212° F. were found to be:

| | Blank | 1% | 2% | 3% | 4% |
|---|---|---|---|---|---|
| Tensile Strength, p.s.i. | 1,315 | 2,300 | 2,010 | 1,890 | 1,870 |
| Ultimate Elongation, percent | 265 | 225 | 190 | 190 | 190 |
| Shore A Hardness | 70 | 74 | 75 | 76 | 76 |

The retention of properties after air oven aging for 72 hours at 212° F. was found to be:

| | Blank | 1% | 2% | 3% | 4% |
|---|---|---|---|---|---|
| Tensile Strength, percent retained | 61 | 77 | 65 | 80 | 78 |
| Ultimate Elongation, percent retained | 42 | 52 | 48 | 59 | 57 |
| Hardness Change, points | 15 | 9 | 8 | 7 | 7 |

Again the excellent improvement effected by the additive in retention of properties after aging is illustrated.

Example III

An aging test was conducted using the base formulation and additions of 1, 2, 3 and 4 parts by weight of test product 2 of Table I. The unaged properties were found to be:

|  | Blank | 1% | 2% | 3% | 4% |
|---|---|---|---|---|---|
| Tensile Strength, p.s.i. | 2,155 | 2,280 | 2,630 | 2,735 | 2,595 |
| Ultimate Elongation, percent | 625 | 595 | 465 | 420 | 390 |
| Shore A Hardness | 55 | 55 | 60 | 64 | 67 |

The properties after air oven aging 72 hours at 212° F. were found to be:

|  | Blank | 1% | 2% | 3% | 4% |
|---|---|---|---|---|---|
| Tensile Strength, p.s.i. | 1,315 | 1,475 | 1,600 | 2,090 | 2,255 |
| Ultimate Elongation, percent | 265 | 225 | 190 | 215 | 225 |
| Shore A Hardness | 70 | 70 | 74 | 75 | 75 |

The retention of properties after air oven aging for 72 hours at 212° F. was found to be:

|  | Blank | 1% | 2% | 3% | 4% |
|---|---|---|---|---|---|
| Tensile Strength, percent retained | 61 | 64 | 60 | 76 | 87 |
| Ultimate Elongation, percent retained | 42 | 37 | 40 | 51 | 57 |
| Hardness Change, points | 15 | 15 | 14 | 11 | 8 |

*Example IV*

An aging test was conducted using the base formulation and additions of 1, 2, 3 and 4 parts by weight of test product 6 of Table I. The unaged properties were found to be:

|  | Blank | 1% | 2% | 3% | 4% |
|---|---|---|---|---|---|
| Tensile Strength, p.s.i. | 2,155 | 2,250 | 2,705 | 1,880 | 2,625 |
| Ultimate Elongation, percent | 625 | 430 | 475 | 400 | 410 |
| Shore A Hardness | 55 | 62 | 64 | 62 | 68 |

The properties after air oven aging 72 hours at 212° F. were found to be:

|  | Blank | 1% | 2% | 3% | 4% |
|---|---|---|---|---|---|
| Tensile Strength, p.s.i. | 1,315 | 1,340 | 1,795 | 1,215 | 2,325 |
| Ultimate Elongation, percent | 265 | 165 | 215 | 180 | 240 |
| Shore A Hardness | 70 | 75 | 75 | 74 | 75 |

The retention of properties after air oven aging for 72 hours at 212° F. was found to be:

|  | Blank | 1% | 2% | 3% | 4% |
|---|---|---|---|---|---|
| Tensile Strength, percent retained | 61 | 59 | 66 | 64 | 80 |
| Ultimate Elongation, percent retained | 42 | 38 | 45 | 45 | 58 |
| Hardness Change, points | 15 | 13 | 11 | 12 | 7 |

*Example V*

An aging test was conducted using the base formulation and additions of 1, 2, 3 and 4 parts by weight of test product 8 of Table I. The unaged properties were found to be:

|  | Blank | 1% | 2% | 3% | 4% |
|---|---|---|---|---|---|
| Tensile Strength, p.s.i. | 2,155 | 2,190 | 2,380 | 2,215 | 2,745 |
| Ultimate Elongation, percent | 625 | 680 | 665 | 520 | 470 |
| Shore A Hardness | 55 | 54 | 54 | 57 | 62 |

The properties after air oven aging 72 hours at 212° F. were found to be:

|  | Blank | 1% | 2% | 3% | 4% |
|---|---|---|---|---|---|
| Tensile Strength, p.s.i. | 1,315 | 1,870 | 1,625 | 1,635 | 2,025 |
| Ultimate Elongation, percent | 265 | 290 | 250 | 220 | 240 |
| Shore A Hardness | 70 | 68 | 70 | 71 | 72 |

The retention of properties after air oven aging for 72 hours at 212° F. was found to be:

|  | Blank | 1% | 2% | 3% | 4% |
|---|---|---|---|---|---|
| Tensile Strength, percent retained | 61 | 85 | 67 | 73 | 73 |
| Ultimate Elongation, percent retained | 42 | 42 | 38 | 42 | 51 |
| Hardness Change, points | 15 | 14 | 16 | 14 | 10 |

*Example VI*

An aging test was conducted using the base formulation and additions of 1, 2, 3 and 4 parts by weight of test product 1 of Table I. The unaged properties were found to be:

|  | Blank | 1% | 2% | 3% | 4% |
|---|---|---|---|---|---|
| Tensile Strength, p.s.i. | 2,155 | 2,335 | 1,805 | 2,350 | 2,810 |
| Ultimate Elongation, percent | 625 | 650 | 640 | 650 | 610 |
| Shore A Hardness | 55 | 53 | 54 | 54 | 59 |

The properties after air oven aging 72 hours at 212° F. were found to be:

|  | Blank | 1% | 2% | 3% | 4% |
|---|---|---|---|---|---|
| Tensile Strength, p.s.i. | 1,315 | 1,510 | 1,395 | 1,610 | 1,525 |
| Ultimate Elongation, percent | 265 | 250 | 240 | 260 | 225 |
| Shore A Hardness | 70 | 68 | 69 | 69 | 70 |

The retention of properties after air oven aging for 72 hours at 212° F. was found to be:

|  | Blank | 1% | 2% | 3% | 4% |
|---|---|---|---|---|---|
| Tensile Strength, percent retained | 61 | 64 | 46 | 56 | 86 |
| Ultimate Elongation, percent retained | 42 | 38 | 34 | 39 | 57 |
| Hardness Change, points | 15 | 15 | 13 | 12 | 9 |

*Example VII*

An aging test was conducted using the base formulation and additions of 1, 2, 3 and 4 parts by weight of test product 3 of Table I. The unaged properties were found to be:

|  | Blank | 1% | 2% | 3% | 4% |
|---|---|---|---|---|---|
| Tensile Strength, p.s.i. | 2,155 | 2,075 | 2,400 | 2,270 | 2,820 |
| Ultimate Elongation, percent | 625 | 575 | 490 | 440 | 450 |
| Shore A Hardness | 55 | 55 | 59 | 62 | 65 |

The properties after air oven aging 72 hours at 212° F. were found to be:

|  | Blank | 1% | 2% | 3% | 4% |
|---|---|---|---|---|---|
| Tensile Strength, p.s.i. | 1,315 | 1,340 | 1,110 | 1,285 | 2,440 |
| Ultimate Elongation, percent | 265 | 220 | 170 | 170 | 260 |
| Shore A Hardness | 70 | 70 | 72 | 74 | 74 |

The retention of properties after air oven aging for 72 hours at 212° F. was found to be:

|  | Blank | 1% | 2% | 3% | 4% |
|---|---|---|---|---|---|
| Tensile Strength, percent retained | 61 | 64 | 46 | 56 | 86 |
| Ultimate Elongation, percent retained | 42 | 38 | 34 | 39 | 57 |
| Hardness Change, points | 15 | 15 | 13 | 12 | 9 |

The antioxidants of this invention were not effective in natural rubber as is illustrated by the following test results. A natural rubber identified as smoked sheet was compounded to provide a base formulation as follows:

Parts by weight
Ribbed Smoked Sheet No. 1 (natural rubber) _____ 100
Zinc Oxide _____ 10
Semi-reinforcing furnace black _____ 35
Stearic acid _____ 3
Light process oil _____ 4
Sulfur _____ 3.5
Benzothiazyl disulfide _____ 0.7

*Example VIII*

An aging test was conducted using the base formulation with smoked sheet (natural rubber), given above, and additions of 1, 2, 3 and 4 parts by weight of test product 2 of Table I. The unaged properties were:

|  | Blank | 1% | 2% | 3% | 4% |
|---|---|---|---|---|---|
| Tensile Strength, p.s.i | 2,800 | 2,750 | 2,605 | 2,590 | 2,415 |
| Ultimate Elongation, percent | 530 | 470 | 455 | 425 | 420 |
| Shore A Hardness | 54 | 61 | 63 | 63 | 65 |

The properties after air oven aging 72 hours at 212° F. were found to be:

|  | Blank | 1% | 2% | 3% | 4% |
|---|---|---|---|---|---|
| Tensile Strength, p.s.i | 1,065 | 1,035 | 805 | 990 | 950 |
| Ultimate Elongation, percent | 255 | 205 | 165 | 180 | 180 |
| Shore A Hardness | 55 | 65 | 67 | 68 | 67 |

The retention of properties after air oven aging for 72 hours at 212° F. was found to be:

|  | Blank | 1% | 2% | 3% | 4% |
|---|---|---|---|---|---|
| Tensile Strength, percent retained | 38 | 37 | 30 | 34 | 38 |
| Ultimate Elongation, percent retained | 48 | 43 | 36 | 42 | 42 |
| Hardness Change, points | 1 | 4 | 4 | 5 | 2 |

*Example IX*

An aging test was conducted using the base formulation with smoked sheet and additions of 1, 2, 3 and 4 parts by weight of test product 6 of Table I. The unaged properties were:

|  | Blank | 1% | 2% | 3% | 4% |
|---|---|---|---|---|---|
| Tensile Strength, p.s.i | 2,800 | 2,430 | 2,515 | 2,155 | 2,385 |
| Ultimate Elongation, percent | 530 | 430 | 420 | 405 | 430 |
| Shore A Hardness | 54 | 62 | 65 | 65 | 64 |

The properties after air oven aging 72 hours at 212° F. were found to be:

|  | Blank | 1% | 2% | 3% | 4% |
|---|---|---|---|---|---|
| Tensile Strength, p.s.i | 1,065 | 595 | 695 | 605 | 565 |
| Ultimate Elongation, percent | 255 | 120 | 185 | 140 | 130 |
| Shore A Hardness | 55 | 65 | 62 | 65 | 65 |

The retention of properties after air oven aging for 72 hours at 212° F. was found to be:

|  | Blank | 1% | 2% | 3% | 4% |
|---|---|---|---|---|---|
| Tensile Strength, percent retained | 38 | 24 | 26 | 28 | 23 |
| Ultimate Elongation, percent retained | 48 | 27 | 38 | 33 | 30 |
| Hardness Change, points | 1 | 1 | 0 | 1 | 0 |

In order to illustrate the effectiveness of the antioxidant in various forms of synthetic rubber the antioxidants of this invention were compounded with Butyl rubber as follows:

*Example X*

The basic formulation for test was:

Parts by weight
Butyl Rubber _____ 100
Zinc Oxide _____ 5
Stearic Acid _____ 1
Medium Abrasion Furnace Carbon Black _____ 60
Process Oil _____ 15
Sulfur _____ 1.5
Tellurium diethyl dithiocarbamate _____ 2
2-Mercaptobenzothiazole _____ 1

The basic formulation was tested alone for control purposes and in admixture with 3 parts by weight of the test product 9 of Table I. The unaged properties were:

|  | Blank | 3% |
|---|---|---|
| Tensile Strength, p.s.i | 1,585 | 1,370 |
| Ultimate Elongation, percent | 425 | 565 |
| Shore A Hardness | 65 | 59 |

The properties after air oven aging 48 hours at 212° F. were found to be:

|  | Blank | 3% |
|---|---|---|
| Tensile Strength, p.s.i | 1,390 | 1,230 |
| Ultimate Elongation, percent | 300 | 420 |
| Shore A Hardness | 70 | 70 |

The retention of properties after air oven aging 48 hours at 212° F. were found to be:

|  | Blank | 3% |
|---|---|---|
| Tensile Strength, percent retained | 87 | 89 |
| Ultimate Elongation, percent retained | 70 | 75 |

It is seen that the antioxidants of this invention are effective in synthetic rubber but not in natural rubber. The percent additions to the test rubber are based on 100% of the rubber in the basic formulation. Hence, 3% antioxidant addition indicates 3% of 100 parts of rubber by weight or 3 parts by weight of antioxidant addition. The Tensile Test is the ASTM-D-412 test entitled "Tension Testing of Vulcanized Rubber." The samples are prepared for test in accordance with the ASTM-D-15 test entitled, "Sample Preparation for Physical Testing of Rubber Products." The hardness test is the ASTM-D-314 test entitled, "Hardness of Rubber."

While preferred embodiments of the novel compositions of the present invention, and the method for their preparation, have been described for purposes of illustration, it will be understood that various modifications and adaptations thereof, which will be obvious to those skilled in the art, may be made without departing from the spirit of the invention.

I claim:
1. Synthetic rubber selected from the group consisting of styrene-butadiene rubber, a polymer of chloroprene and isobutylene-isoprene butyl rubber containing between about 0.1 and about 10 parts per hundred, by weight, of the reaction product of an alkyl hydroxyaromatic compound having from 8 carbon atoms to about 34 carbon atoms in the alkyl portion thereof; and a polyalkylene-amine having the formula $H_2NRNH(RNH)_xH$, wherein R is an alkylene radical having from 2 to 3 carbon atoms and $x$ is an integer varying between 1 and 3, the molar ratio of said alkyl hydroxyaromatic compound to said polyalkylene-amine varying between about 1 and about 6.

2. Synthetic rubber selected from the group consisting of styrene-butadiene rubber, a polymer of chloroprene and isobutylene-isoprene butyl rubber containing between about 1 and about 4 parts per hundred, by weight, of the reaction product of mononoyl phenol and a polyalkylene-amine having the formula $H_2NRNH(RNH)_xH$, wherein R is an alkylene radical having from 2 to 3 carbon atoms and $x$ is an integer varying between 1 and 3, the molar ratio of said mononoyl phenol to said polyalkylene-amine varying between about 1 and about 6.

3. A synthetic rubber selected from the group consisting of styrene-butadiene rubber, a polymer of chloroprene and isobutylene-isoprene butyl rubber containing between about 1 and about 4 parts per hundred, by weight, of the reaction product of about two moles of mononoyl phenol and about one mole of triethylenetetramine.

4. Synthetic rubber selected from the group consisting of styrene-butadiene rubber, a polymer of chloroprene and isobutylene-isoprene butyl rubber containing between about 1 and about 4 parts per hundred, by weight, of the reaction product of dinonyl catechol and a polyalkylene-amine having the formula $H_2NRNH(RNH)_xH$, wherein R is an alkylene radical having from 2 to 3 carbon atoms and $x$ is an integer varying between 1 and 3, the molar ratio of said dinonyl catechol to said polyalkylene-amine varying between about 1 and about 6.

5. A synthetic rubber selected from the group consisting of styrene-butadiene rubber, a polymer of chloroprene and isobutylene-isoprene butyl rubber containing between about 1 and about 4 parts per hundred, by weight, of the reaction product of about 1.4 moles of dinonyl catechol and about one mole of triethylenetetramine.

6. Synthetic rubber selected from the group consisting of styrene-butadiene rubber, a polymer of chloroprene and isobutylene-isoprene butyl rubber containing between about 1 and about 4 parts per hundred, by weight, of the reaction product of dinonyl resorcinol and a polyalkylene-amine having the formula $H_2NRNH(RNH)_xH$, wherein R is an alkylene radical having from 2 to 3 carbon atoms and $x$ is an integer varying between 1 and 3, the molar ratio of said dinonyl resorcinol to said polyalkylene-amine varying between about 1 and about 6.

7. A synthetic rubber selected from the group consisting of styrene-butadiene rubber, a polymer of chloroprene and isobutylene-isoprene butyl rubber containing between about 1 and about 4 parts per hundred, by weight, of the reaction product of about 1.4 moles of dinonyl resorcinol and about 1 mole of triethylenetetramine.

8. Synthetic rubber selected from the group consisting of styrene-butadiene rubber, a polymer of chloroprene and isobutylene-isoprene butyl rubber containing between about 1 and about 4 parts per hundred, by weight, of the reaction product of (1) the reaction product of a paraffin wax containing three atomic proportions of chlorine and having a chlorine content of 14 percent, with one mole of phenol, and (2) a polyalkylene-amine having the formula $H_2NRNH(RNH)_xH$, wherein R is an alkylene radical having from 2 to 3 carbon atoms and $x$ is an integer varying between one and three, the molar ratio of said reaction product (1) to said polyalkylene-amine varying between about 1 and about 6.

9. A synthetic rubber selected from the group consisting of styrene-butadiene rubber, a polymer of chloroprene and isobutylene-isoprene butyl rubber containing between about 1 and about 4 parts per hundred, by weight, of the reaction product of (1) about 5.56 moles of the reaction product of a paraffin wax containing three atomic proportions of chlorine and having a chlorine content of 14 percent, with one mole of phenol, and (2) about 1 mole of triethylenetetramine.

References Cited by the Examiner

UNITED STATES PATENTS

| | | | |
|---|---|---|---|
| 2,013,319 | 9/1935 | Semon | 260—809 |
| 2,256,753 | 9/1941 | Scheumann | 260—567.5 |
| 2,829,121 | 4/1958 | Leeper | 260—45.95 |
| 2,928,876 | 3/1960 | Spivack et al. | 260—45.9 |
| 3,043,774 | 7/1962 | Coffield | 260—809 |
| 3,161,612 | 12/1964 | Ley et al. | 260—45.9 |

DONALD E. CZAJA, *Primary Examiner.*

LEON J. BERCOVITZ, *Examiner.*